INVENTORS
ADOLF FRÖHLICH &
EDWARD J. HARRIS
BY
*J. William Freeman*

ATTORNEY

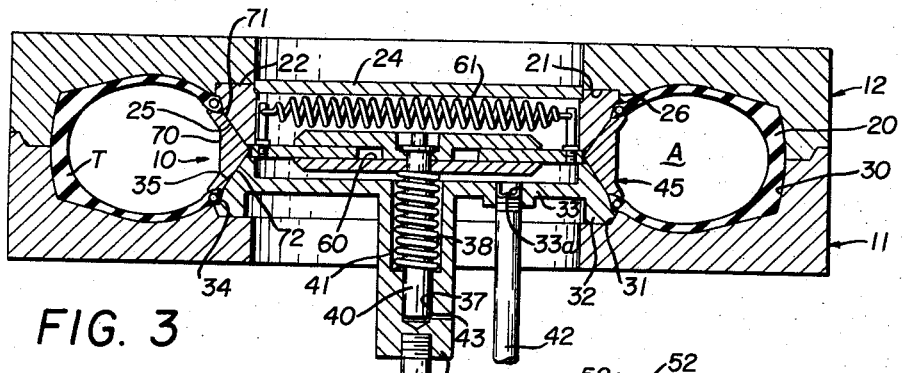
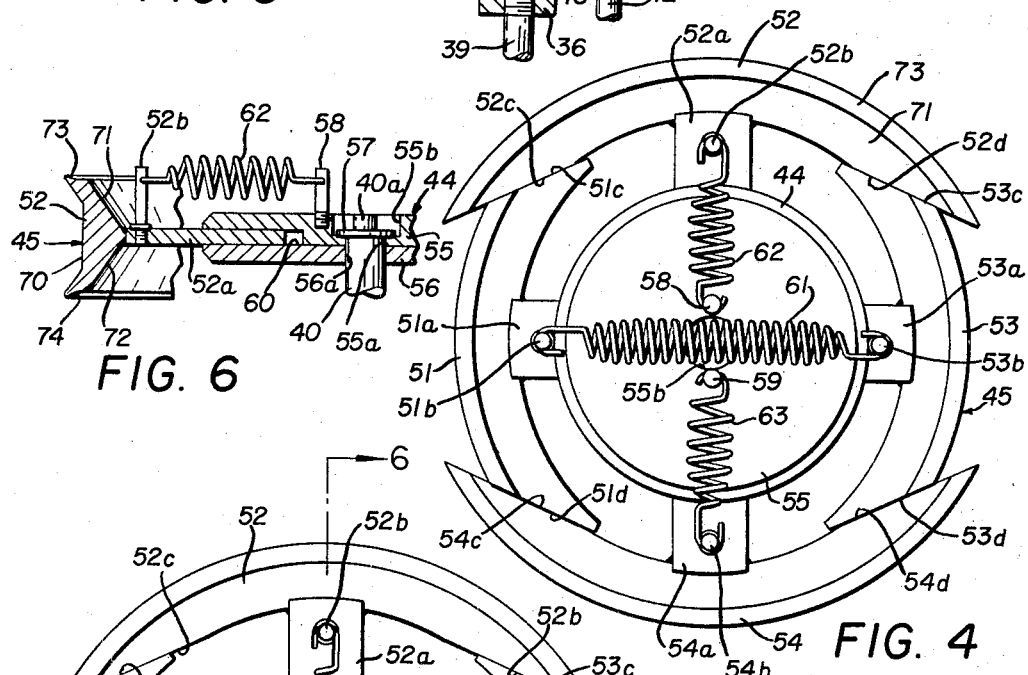
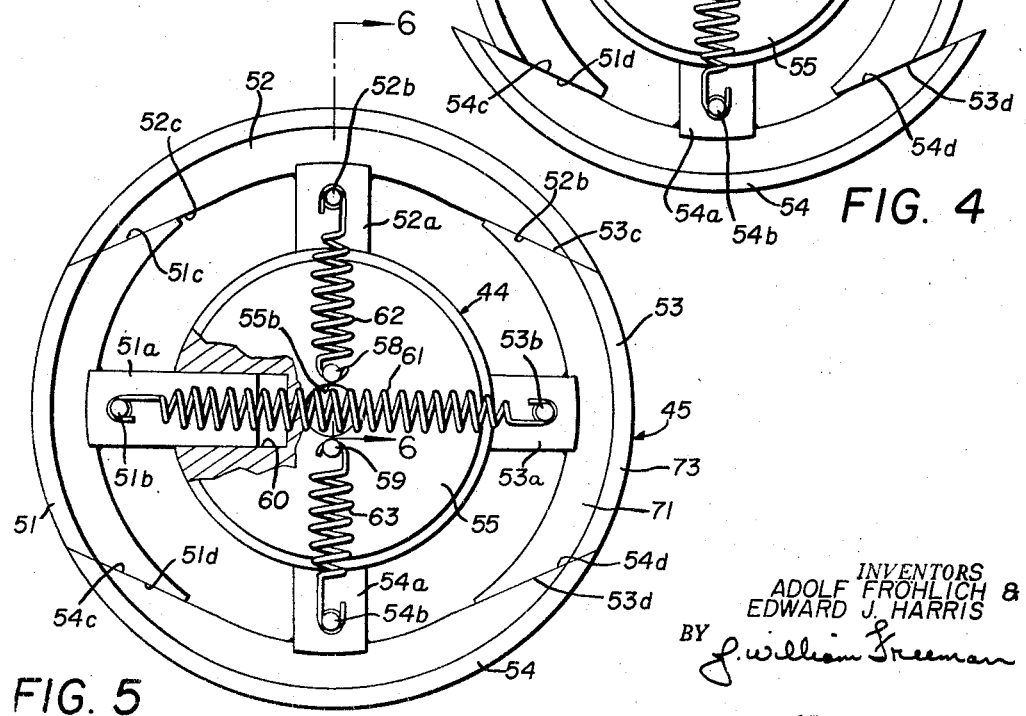

United States Patent Office 2,904,832
Patented Sept. 22, 1959

2,904,832

EXPANDABLE BEAD RING FOR VULCANIZING PRESSES

Adolf Fröhlich, Hannover, Germany, and Edward J. Harris, Akron, Ohio, assignors to The Cleveland Trust Company, Cleveland, Ohio, as trustee Application August 24, 1955, Serial No. 530,381

2 Claims. (Cl. 18—17)

This invention relates to the art of pneumatic tire vulcanization, and in particular, has reference to a new and improved type of bead ring sealing device capable of utilization in pneumatic vulcanizing presses of known construction.

In the past, the manufacture of pneumatic tires has been effectuated by first forming a plurality of fabric plies in flat form so as to build up a plurality of such layers in what is conventionally referred to as a "flat-built" tire. This "flat-built" tire is then positioned in a vulcanizing press, where the same is shaped to toroidal form by the use of a pneumatic former of known type.

While the above type of structure has generally received wide acceptance, it is believed disadvantageous in that it requires the use of a relatively complex mechanism to effectuate the timed entrance and withdrawal of the pneumatic former. Additionally, such formers have been found to have a relatively short duration of use, and accordingly must be frequently replaced to thus add to the overall cost of vulcanizing pneumatic tires.

It has been proposed in the past, to vulcanize pneumatic tires without the use of a pneumatic former. However, such efforts have invariably been unsuccessful, in view of the fact that it was heretofore impossible to provide an efficient type of bead ring mechanism that would serve the dual purpose of creating an air-tight seal at the bead area of the tire being cured, while simultaneously being easy to install and remove prior to and after the vulcanization cycle.

It accordingly becomes a principal object of this invention to provide an improved type of bead ring mechanism for use in bagless vulcanizing presses that is characterized by the fact that the bead ring is capable of having a movable radial dimension to facilitate removal and insertion of the same with respect to the pneumatic tire being vulcanized.

It is a further object of this invention to provide an improved type of vulcanizing press having as an integral part thereof a radially expansible bead ring that has the radial dimension automatically changed upon the closing movement of the vulcanizing press.

It is a still further object of this invention to provide a bagless vulcanizing press having expansible bead sealing means thereof that are automatically positioned and withdrawn from contact with the tire being cured upon opening and closing of the press.

These and other objects of the invention will become more apparent upon a reading of the following brief specification, considered and interpreted in the light of the accompanying drawings.

Of the drawings:

Figure 3 is a sectional view illustrating the position of the component parts in the fully closed position.

Figure 4 is a plan view, partly broken away and in section, and illustrating the bead ring member in its retracted position.

Figure 5 is a plan view similar to Figure 4, but showing the bead ring in the extended condition.

Figure 6 is a view taken on the lines 6—6 of Figure 5.

Figure 1:
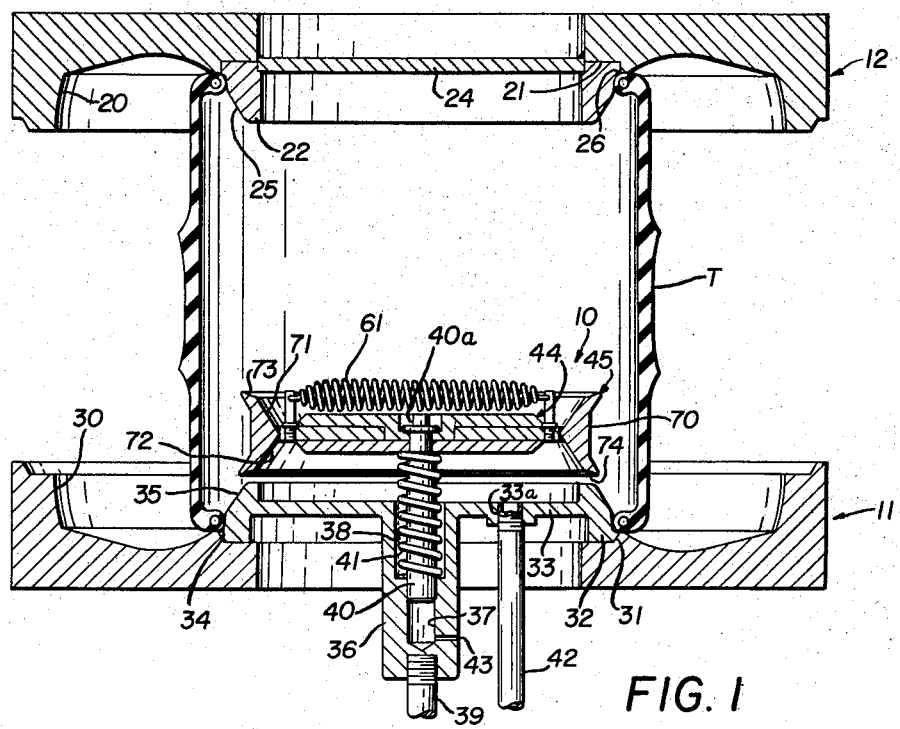
Figure 1 is a sectional view illustrating the component parts of an initial stage of closure.

Referring now to the drawings, and in particular, to Figure 1 thereof, the improved bead ring, generally designated by the numeral 10 is shown carried by lower bead section 11 of a vulcanizing press (not shown) so as to coact with certain component parts of upper mold section 12, to accordingly effectuate vulcanization of an uncured pneumatic tire T that is deformed to toroidal shape upon closing of the above described mold section, as will be presently described.

Considering first the structure of the upper mold section 12, it will be seen that the same includes the usual design-imparting cavity 20 that terminates adjacent the bead portion thereof, in a circular undercut 21 which serves as a seat for a ring member 22 that is attached thereto, together with closure plate 24. This ring member 22 has the outer face thereof contoured to define a tapered surface 25 and a bead seat 26; the arrangement being such that the surface 25 is designed for engagement with ring unit 10, in a manner to be described; while the seat 26 receives the upper bead portion of the uncured tire T as shown in Figure 1.

Figure 2:
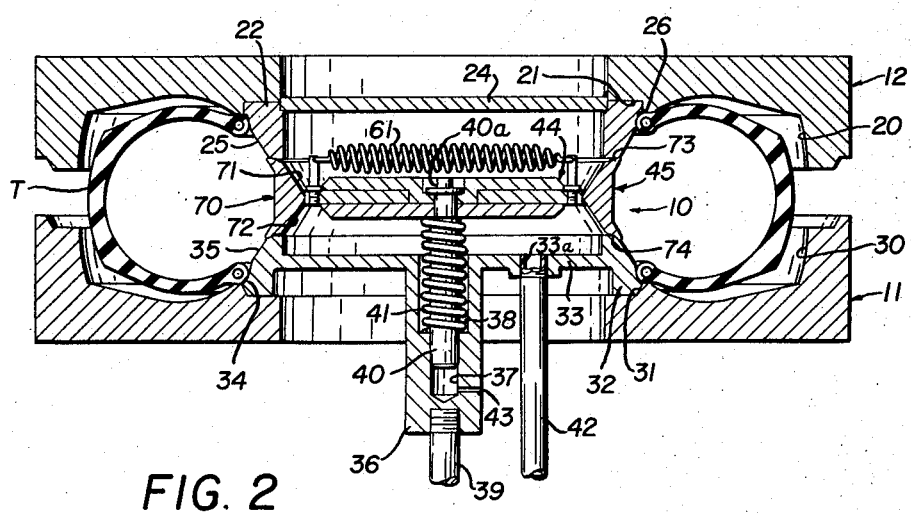
Figure 2 is a sectional view similar to Figure 1 of the drawings, but illustrating a more advanced stage of closure.

By like token, the lower mold section 11 is shown as being substantially standard in construction, and accordingly includes design-imparting surface 30 defining at the bead portion thereof, a circular undercut 31 that seats the radial flange portion 32 of a plate 33. As before, the outer radial surface of the flange 32 is contoured to define a bead seat 34 and an inclined surface 35 that respectively coact with the tire T and ring unit 10 when the mold sections 11 and 12 are moved towards the closed position thereof, as shown in Figures 2 and 3 of the drawings.

For the purpose of receiving the ring unit 10 in axially shiftable relationship therewith, the plate 33 is shown provided with a central hub 36 that is bored and counterbored as at 37 and 38, respectively, so as to receive a shaft 40 and a spring 41 that surrounds the same. The projecting axial end of hub 36 is further shown tapped to receive a shaft 39, the free end of which may be secured to a hydraulic piston or the like (not shown) so as to effectuate axial shifting of plate 33 relatively of lower mold section 11.

While relative movement of plate 33, with respect to lower mold section 11 may be effectuated as just described, provision is also made for axially shifting the ring unit 10 relatively of the plate 33; and to this end, the plate 33 is further shown provided with an aperture 33a through which is mounted, in known manner, a supply pipe 42. By like token, a bleed-off port 43 is shown provided in the body of the hub 36 adjacent the lower end of bore 37 so as to facilitate the controlled exhaust of air from the bore 37 when the shaft 40 is lowered therein during the movement from Figures 2 to 3, for example.

Turning now to the construction of the ring unit 10, it will be seen that the same includes a base, generally designated as 44 that is mounted on the reduced end portion 40a of shaft 40, so as to serve as a mounting hub for a segmented bead ring 45; the arrangement being such that the individual segments 51, 52, 53, and 54 of bead ring 45 have their respective shanks 51a, 52a, 53a, and 54a shiftably mounted in base 44 so that the ring 45 can be collapsed to a reduced diameter, as shown in Figure 4, in a manner to be described.

To this end the base 44 is shown as being defined by abutting plates 55, 56 that are centrally apertured as at 55a, 56a so as to permit reception thereof about reduced end 40a of shaft 40, with nut 57 being received in undercut 55b so as to be flush with the exposed surface of plate 55. As best shown in the breakaway detail of Figure 5, the plate 55 further includes a plurality of guide slots 60, 60 that extend radially of the plate 55 so as to serve as guide ways for the shank portions 51a, 52a, 53a, and 54a. In this manner, the shanks 51a, 52a, 53a, and 54a can all be urged radially inward to the position of Figure 4 by the use of springs 61, 62 and 63; with spring 61 interconnecting shanks 51a and 53a through pins 51b and 53b, while springs 62 and 63 respectively interconnect pins 52b and 54b with pins 58, 59 that project from plate 55 (see Figure 6).

As above indicated, the segments 51, 52, 53, and 54 are normally maintained in the collapsed position of Figure 4 by the use of springs 61, 62 and 63. Accordingly, these segments 51, 52, 53, and 54 are arranged so that radial expansion of one opposed pair of segments, such as 51 and 53 will operate to radially urge the remaining pair of segments (52 and 54) apart. Such coaction is shown accomplished by the use of a wedging action that results from the engagement of complemental surfaces. Thus, the tapered surfaces 51c, 51d of segment 51 respectively abut tapered surfaces 52c and 54c of segments 52 and 54, respectively, while surfaces 52d and 54d abut against the inclined complemental surfaces 53c, 53d of segment 53. In this manner, as the members 51 and 53 are separated, as will be described, their inclined faces (51c, 51d, 53c, 53d) will coact with the complemental abutting faces of members 52 and 54 and cause the same to be correspondingly separated until the fully expanded position of Figure 5 is reached.

As previously indicated, the above described change in radial dimension of ring unit 10 is timed to the closing of the mold sections 11 and 12; and more specifically in this regard, the exact instant of spreading action of ring unit 10 commences when the ring member 22 and flange 32 contact certain axially spaced portions of the arcuate members 51, 52, 53, and 54, as shown in Figure 2 of the drawings.

To this end in Figure 6 of the drawings, there is illustrated a typical cross-section of the individual arcuate members, with the arcuate member 52 being taken in this case as representative of the configuration involved. It will accordingly be seen that this cross-sectional configuration includes an outer radial wall surface 70, as well as inner radial wall surfaces 71 and 72 that taper axially of the member 52 so as to reach a point of juncture adjacent the point of connection with the shank 52a. In addition to the surfaces 71 and 72 which have just been described, the axial extremities of the individual arcuate members are provided with contoured radii 73 and 74 that serve as points of initial contact with the ring member 22 and flange 32, respectively.

Although not shown in the drawings for the sake of clarity, it is to be understood that conduit means (not shown) are provided to communicate fluid pressure between the outer and inner radial surfaces of at least one segment. In this manner, fluid pressure can be supplied to the annular chamber A (see Figure 3) when the press is closed.

In use or operation of the improved bead ring for pneumatic tires, it will first be assumed that the component parts are in the position of Figure 1 of the drawings, wherein a "flat-built" tire T has had the lower bead portion thereof positioned on bead set 34 of flange 32, while the upper mold section has ben moved downwardly by actuation of the press in known manner, so as to bring the bead seat 26 into contact with the upper bead portion of the tire T. In this position, it will be further assumed that the ring unit 10 is in the radially retracted position of Figures 1 and 4 of the drawings, and further, that the same is axially extended from the plate 33 as a result of the force afforded by the spring 41.

As the mold section 12 reaches the position of Figure 2, it is believed apparent that an initial contact will be established between contoured surfaces 73, 73 of segments 51 and 53, and as this closing of the mold sections continues, it is apparent that the entire ring unit 10 will move downwardly as the result of said initial contact until the contoured surfaces 74, 74 of segments 51 and 53 contact the flange 32. At this point, the condition of Figure 2 is reached and further closing movement of the press will result in faces 25, 35 spreading the segments apart against the force of spring 61 as a result of the contact with complementally inclined surfaces 71, 71 and 72, 72. As such spreading of segments 51 and 53 occurs, it is manifest that similar spreading apart of segments 52 and 54 will occur as a result of the contact between the complementally tapered arcuate portions of these segments.

As this overall spreading action of segments 51, 52, 53, and 54 continues, it is apparent that the same will reach the fully expanded condition thereof (see Figure 5) at at approximately the same time the bead sections of the tire T are urged into contact with contoured surfaces 73 and 74, which are now arranged in a circular course as a result of having been fully expanded as just described. Thus, the last closing movement of the mold section 12 to the position of Figure 3 operates to firmly clamp the bead portions of the tire T in place, with the result that the same is fixedly secured at the bead area with the upper bead being held between seat 26 and surface 73, while the lower head is retained between seat 34 and surface 74.

At this time, vulcanizing medium may be introduced interiorly of the annular chamber A (see Figure 3) by merely supplying steam through conduit means (not shown) that extend through any one or all of the arcuate members 51, 52, 53, and 54.

When the vulcanization cycle has been completed, the mold sections may be separated, and during such separating movement, it is believed apparent that the supply of pressurized fluid through conduit 42 forces the plate to move upwardly and accordingly, automatically strips the cured tire T from the design-imparting surface 31 of lower mold section 11. During such releasing movement, it is believed also apparent that the expanding force offered by the inclined surfaces 25 and 35 will have been removed, and accordingly, the combined action of the springs 61, 62, and 63 will operate to retract the arcuate members 51, 52, 53, and 54 to the position of Figure 4, which retraction will also operate to automatically remove the ring unit 10 with respect to the bead portion of the cured tire T so that the same may be easily removed therefrom for repetition of the above-described cycle of operation.

It will be seen from the foregoing that there has been provided a new and novel type of radially expandable bead mechanism for curing pneumatic tires. It has been shown how the automatic change in radial dimension facilitates both the easy insertion of an uncured tire and the complete sealing off of the same in the bead area by providing an air-tight seal at this critical point. It has been shown how this new and novel type of vulcanizing press eliminates the need for the conventional pneumatic former, in view of the fact that an air-tight seal is created interiorly of the annular chamber A, as a result of the new and novel structure of the component parts above described.

It is believed important to note that the radial expansion of the bead ring is timed to the closing action of the vulcanizing press, with the result that this expansion is automatically effectuated upon closing of the press. Additionally, it is believed important to note that the structure of the bead ring unit per se is such that the same can be easily installed on existing vulcanizing presses with a minimum amount of change being required to facilitate such installation.

Figure 7:
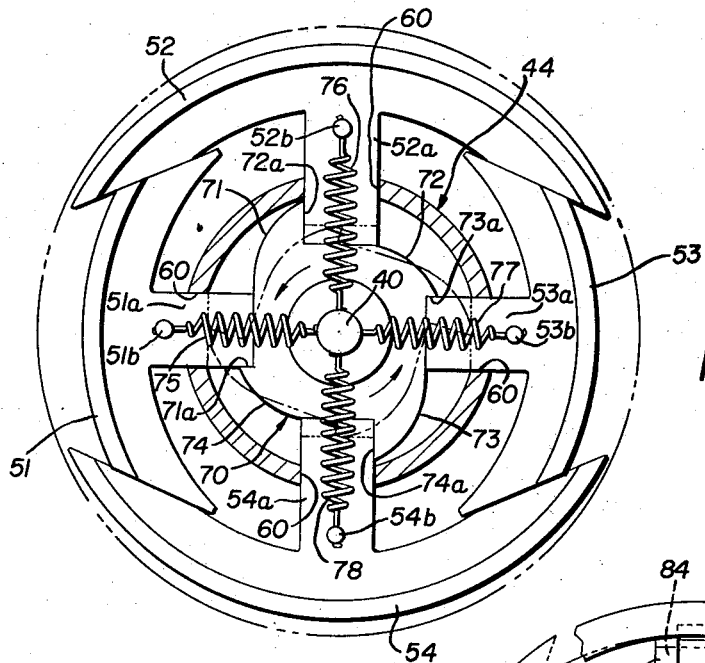
Figure 7 is a plan view, partly in section, illustrating a modified form of the bead ring member.

In the modified form of the invention shown in Figure 7 of the drawings, there is illustrated a slightly modified form of the invention which is similar in many respects to that described in Figures 1 to 6 of the drawings, but varies in the manner in which the individual segments 51, 52, 53 and 54 are actuated to cause expansion of the ring 10.

As before, the expandable bead mechanism 10 is employed with a vulcanizing press having mold sections 11 and 12 that operate to move between open and closed positions in known manner. Accordingly, where indicated, like numerals indicate like parts.

To this end, the members 51, 52, 53 and 54 have their shank portions 51a, 52a, 53a, 54a, in radial slots 60, 60 of plate 44 so as to be radially shiftable with respect to central shaft 40. As shown in Figure 7 of the drawings, these slots 60, 60 are slightly modified in that the same are open at each radial end thereof and in this manner the peripheral edge portion of a cam plate 70 acts within these slots 60, 60 to control the radial positioning of the members 51, 52, 53 and 54.

To facilitate such control, the cam plate 70 is shown mounted axially on shaft 40 so as to be rotatable therewith with the radial outline configuration thereof defining a plurality of cam surfaces 71, 72, 73 and 74; the arrangement being such that these cam surfaces 71, 72, 73 and 74 respectively ride against the ends of shanks 51a, 52a, 53a, and 54a, so as to control the radial positioning of the same in slots 60, 60 upon rotation of shaft 40. Because of the increase in radial dimension between the arcuate ends of each cam surface, the outline configuration of cam plate 70 further includes radially projecting wall surfaces 71a, 72a, 73a, and 74a, that respectively abut against shank portions 51a, 52a, 53a and 54a, when the parts are in the full line position of Figure 7.

With regard to these just-described radial wall surfaces of cam plate 70, it will be noted that walls 72a and 74a extend for a greater radial distance because of the fact that the members 51 and 53 must be moved a further radial distance than must the members 52 and 54 in order for all such members to reach the fully expanded condition as indicated by the chain-dotted line in Figure 7 of the drawings.

For the purpose of retaining the members 51, 52, 53 and 54, against the cam surfaces 71, 72, 73 and 74, there are provided a plurality of springs 75, 76, 77 and 78, that are respectively interposed between the members 51, 52, 53 and 54 and the shaft 40, with the usual pins 51b, 52b, 53b and 54b being provided on shanks 51a, 52a, 53a, and 54a for this purpose.

In use or operation of this modified form of the invention, the mold sections 11 and 12 will be moved towards the closing position as previously described. During this period of closure, it is merely necessary to rotate shaft 40, at which time it is believed apparent that the shank portions 51a and 53a will be separated as a result of contact with cam surfaces 71 and 73, respectively, with similar movement apart of members 52 and 54 occurring as result of contact with cam surfaces 72 and 74 until the entire group of segments 51, 52, 53 and 54 moves into the chain-dotted line position shown in Figure 7, which is the fully expanded condition thereof.

When the mold sections are separated, it is apparent that the reverse action will occur and the segments will be collapsed to the full-time position of Figure 7.

Figure 8:
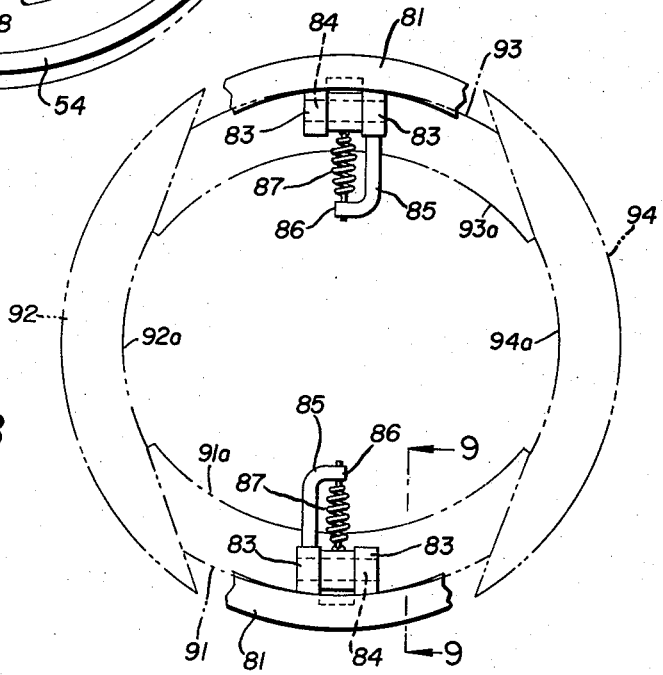
Figure 8 is a plan view, partly in broken lines, illustrating still another modified form of the bead ring member.
Figure 9:
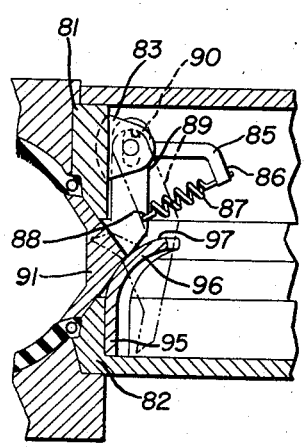
Figure 9 is a cross-sectional view taken along the lines 9—9 of Figure 8.

In the form of the invention illustrated in Figures 8 and 9 of the drawings, there is illustrated a second modified form of the radially expansible bead member that is capable of coaction with the relatively movable mold sections 11 and 12. Accordingly, this form of the invention contemplates an annular ring 81 that is carried by the upper mold section 12, and a second annular ring 82 that is carried by the lower mold section 11; the arrangement being such that the annular ring 81 pivotally supports a plurality of ring segments as will be presently described, while the lower ring 82 carries guide means for moving these segments to the full-line position shown in Figure 9 of the drawings.

To this end, the annular ring 81 carries a plurality of projecting lug members 83, 83 (see Figure 8), that are arranged in pairs so as to support therebetween a pin 84. Additionally, each lug member 83a further includes a projecting arm 85 that has the free end 86 thereof presented at right angles so as to support one free end of a spring 87. The other end of spring 87 is shown secured to a projecting pin 88, that is in turn fastened to a lug extension 89 of an individual segment 91, it being understood that the segment 91 is typical of the other segments employed. In the preferred embodiment of the invention, the use of four such segments 91, 92, 93 and 94 is contemplated. Accordingly, each lug extension 89 is shown pivotally mounted about the pin 84 through a guide slot 90 that is provided in each said lug extension 89.

As previously indicated, the positioning of the individual segments 91, 92, 93 and 94 is effectuated as a result of contact between these segments and certain guide means that are carried by the lower annular ring 82. Accordingly, as best shown in Figure 9 of the drawings, these guide means contemplate the use of an annular ring member 95 that has an inturned radial lip 96 that extends radially inwardly so as to provide a contoured surface 97.

In use or operation of the improved modified form of the invention, it will first be assumed that the component parts are in an open position (not shown), and at this time, it is to be understood that the individual segments 91, 92, 93 and 94 will be in the chain-dotted line position of Figure 9 as a result of the influence exerted against the individual lugs 89, 89 by the spring 87. At this point, it is apparent that these segments will define a bead ring of reduced diameter that is capable of being inserted interiorly of the flat-built tire T when the same is supported on the lower mold section 11, as has been previously described.

As the mold sections 11 and 12 approach each other, it is apparent that the lower divergent portions 91a, 92a, 93a and 94a of each segment 91, 92, 93 and 94, respectively, will engage against the contoured surface 97; and as further closing movement continues, it is believed apparent that this closing movement will operate to pivot the various segments 91, 92, 93 and 94 about the shaft 84, with the result that as such closure of the mold sections is continued, the individual segments 91, 92, 93 and 94 will assume the full-line position of Figure 9 coincident with the final closing of the press. It is accordingly apparent at this time that vulcanization can be commenced and continued for the requisite period of time with vulcanizing medium being supplied interiorly of the chamber A through connecting pipes of the type previously indicated which extend through the individual segments 91, 92, 93 and 94.

When the mold sections 11 and 12 are once again opened after the completion of the vulcanization cycle, the action of the individual springs 87, 87 will return the segments 91, 92, 93 and 94 to the chain-dotted line position of Figure 9, at which time the finished tire can be easily removed from the bead seat therefor.

It is believed apparent from the foregoing that several varied and distinct types of expandable bead rings can be used in connection with known prior art vulcanizing presses with equal results being obtained in each case when the expansion of the bead ring is timed to the closing of the vulcanizing press.

It accordingly follows that additional types and forms of expandable bead rings may be provided within the purview of this invention, provided that the same are capable of undergoing an increase in radial dimension upon the closing of the press.

Accordingly, modifications of the invention, wherein other forms of expandable bead rings are employed, may be resorted to without departing from the spirit thereof or the scope of the appended claims.

What is claimed is:

1. A vulcanizing press of the character described, comprising; a pair of relatively movable, complemental mold sections; a pair of bead seats respectively carried by said mold sections in aligned relationship about the common axis thereof; means for opening and closing said mold sections; a radially expansible bead ring carried by one said mold section for positioning between said mold sections in concentricity therewith and having axially spaced bead seats provided thereon adjacent the periphery thereof; and means for radially expanding said bead ring upon contact of the same with said remaining mold section during closing movement of said press, whereby said bead seats thereof will be substantially axially aligned with said bead seats of mold sections when said bead ring is in said expanded condition; said means for radially expanding said bead ring including complementary tapered surfaces on both said sets of bead seats that extend axially of said ring, whereby axial movement of said bead seats of said mold sections against said bead seats of said bead ring will urge said bead seats of said bead ring apart.

2. A vulcanizing press of the character described, comprising; a pair of relatively movable, complemental mold sections; a pair of bead seats respectively carried by said mold sections in aligned relationship about a common axis thereof; means for opening and closing said mold sections; a radially expansible bead ring carried by one said mold section for positioning between said mold sections in concentricity therewith and having axially spaced bead seats provided thereon adjacent the periphery thereof; and means for radially expanding said bead ring upon contact of the same with said remaining mold section during closing movement of said press, whereby said bead seats thereof will be substantially axially aligned with said bead seats of said mold section when said bead ring is in said expanded condition; said means including tapered complemental surfaces provided on said mold sections and said bead ring whereby relative axial movement of said surfaces with respect to each other results in expansion of said ring.

References Cited in the file of this patent

UNITED STATES PATENTS

| 560,123 | Doughty | May 12, 1896 |
| 1,466,366 | Lehmann | Aug. 28, 1923 |
| 2,571,258 | Kolins | Oct. 16, 1951 |
| 2,645,265 | O'Neil | July 14, 1953 |
| 2,736,059 | Frank | Feb. 28, 1956 |